March 6, 1928.  W. J. MEAD  1,661,190

VALVE

Filed May 13, 1927  2 Sheets-Sheet 1

Inventor
William J. Mead

By Hardway Cather
Attorney

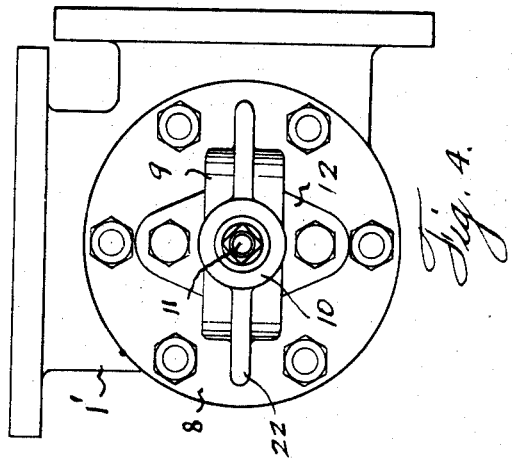
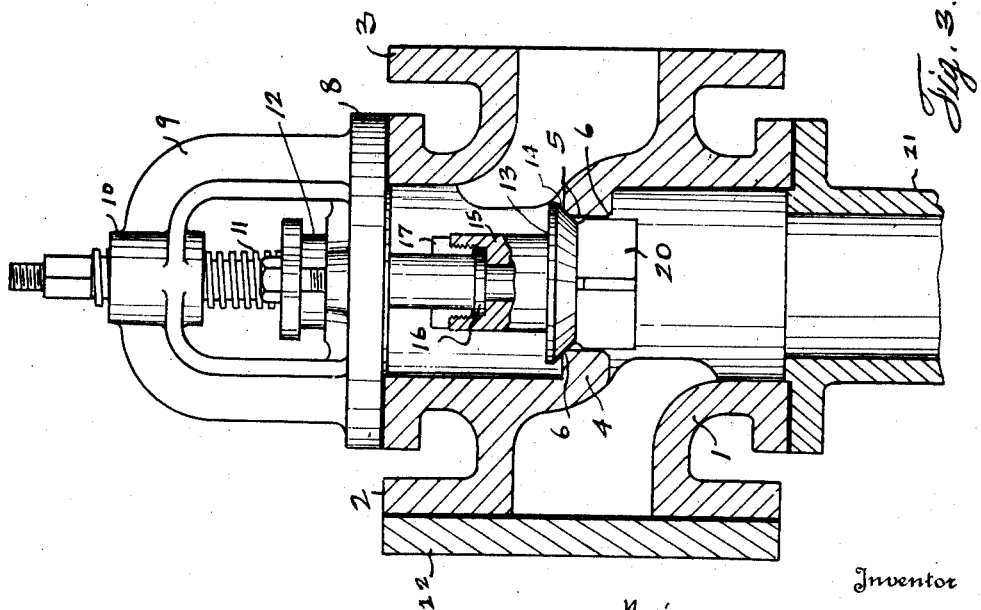

Patented Mar. 6, 1928.

1,661,190

UNITED STATES PATENT OFFICE.

WILLIAM J. MEAD, OF GALVESTON, TEXAS.

VALVE.

Application filed May 13, 1927. Serial No. 191,146.

This invention relates to new and useful improvements in a valve.

One object of the invention is to provide a valve mechanism adapted to be incorporated into pipes, or flow lines, of any character, and of a novel construction embodying a double valve seat through which the fluid to be controlled passes, with a valve adapted to cooperate with the seat to control the flow of fluid and applicable, for the puropse stated, to either side of the seat.

With the above and other objects in view this invention has particular relation to certain novel features of construction, operation and arrangement of parts, an example of which is given in this specification and illustrated in the accompanying drawings, wherein:—

Figure 3 shows a modified form of the valve, as applied to a T connection, and

Figure 4 shows a plan view thereof, as applied to an elbow.

Figure 1:
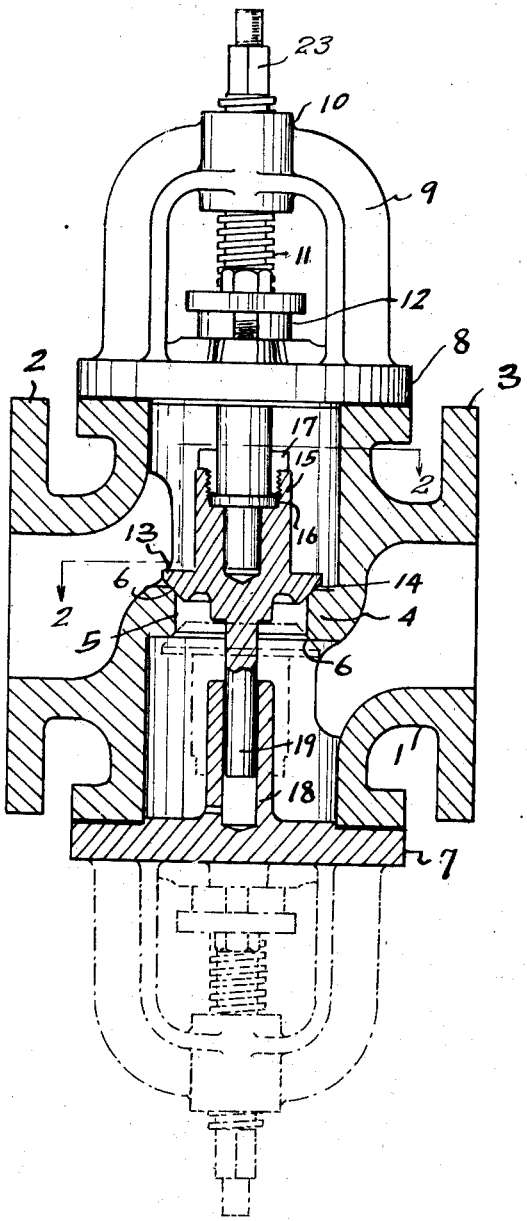
Figure 1 shows a vertical sectional view of the valve mechanism.

Referring now more particularly to the drawings, wherein like numerals of reference designate similar parts in each of the figures the numeral 1 designates a valve casing shown in the form of a T with the flanges 2, 3, forming connections for adjacent sections of the pipe or flow line into which the casing is connected. This casing has a transverse web 4 therein with an opening 5 through it surrounded by the oppositely disposed annular beveled seats 6, 6.

Fastened to the valve casing 1 are the oppositely disposed end plates 7, 8, the latter of which has a yoke 9 secured thereto formed with the internally threaded bearing 10. Threaded through this bearing there is a valve stem 11 which works through the stuffing box 12 in the adjacent end plate 8.

Cooperating with one of the valve seats 6, and controlling the opening 5, there is a disc-like valve 13 having a beveled face 14. Upstanding from the back of the valve 13 there is a sleeve 15 and the inner end of the stem 11 is reduced and fitted into said sleeve. Adjacent the reduced end of the stem there is an annular rib 16, formed on said stem and a split nut 17 is screwed into the outer end of said sleeve, around said stem, with its inner end abutting said rib, thus forming a swivelling connection between the stem and valve and preventing the detachment of the stem from the valve.

As shown in Figure 1 the end plate 7 has an inwardly projecting bearing 18 and the valve 13 carries a guide 19 which works in said bearing to insure the perfect seating of the valve on its seat.

In Figure 3 the valve 13 is provided with a winged guide 20 which works through the opening 5 to insure the proper seating of said valve.

In the form shown in Figure 1 the fluid to be controlled flows through the line connected to the connections 2 and 3, while in the form shown in Figure 3 the end plate 7 is shown removed and a section of the flow line 21 is connected to this end of the casing 1 and the connection 2 closed by the plate 22.

Figure 2:
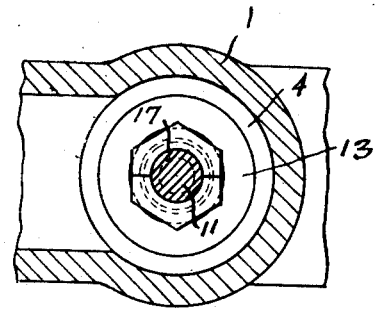
Figure 2 shows a cross sectional view, taken on the line 2—2 of Figure 1.

Figure 4 shows the casing 1' in the form of an elbow. In the forms shown in figures 1, 2 and 4 when one of the valve seats becomes worn so that the valve is permitted to leak the plates 7 and 8 may be reversed so that the valve 13 will cooperate with the other seat, while in order to accomplish this result in the form shown in Figure 3 the plate 8 and flow line 21 may be reversed.

The valve, in each form, may be opened and closed by turning the stem 11 in an appropriate direction. This stem may be turned through a suitable wrench, or grip member as 23, applied to the outer end thereof. It is to be noted that as the stem 11 has a swivelling connection with its valve, the valve will not be rotated or turned while in contact with its seat and the valve and seat will not be worn by any frictional action between them.

The valve mechanism constituting the invention can be used as a conventional globe valve, angle valve, or cross valve and in either case may be used as a check valve, thus making it unnecessary to keep on hand six separate valves as the one valve mechanism may be used to take the place of either of the six types.

When the seat, cooperating with the valve 13 becomes cut out or injured in any way causing a leak the end plate carrying said valve may be reversed, with respect to the valve casing so that the valve 13 will cooperate with the other seat, thus making it unnecessary to discard the complete valve mechanism and substitute a new one for it.

While I have shown and described certain specific types of the invention it is to be understood that mechanical changes may be made in the construction without departing from the principle of the invention and I reserve the right to make such mechanical changes as may be found desirable so long as I do not depart from the principle of the invention, as embodied within the scope of the appended claims.

What I claim is:—

1. A device of the character described including a casing having a fluid conduit therethrough, a web in the casing having an opening which forms a continuation of said conduit, said web being formed with valve seats, one on each side of said opening, removable end plates carried by the casing, a yoke carried by one of said end plates and formed with an internally threaded bearing, a valve stem threaded through said bearing and passing through the corresponding end plate, a valve having a swivelling connection with said stem and adapted to cooperate with one of said seats to open or close said opening and a detachable split-nut retaining the valve on the stem.

2. A device of the character described including a casing having a fluid conduit therethrough, a web in the casing having an opening which forms a continuation of said conduit, said web being formed with valve seats, one on each side of said opening, removable end plates carried by the casing, a yoke carried by one of said end plates and formed with an internally threaded bearing, a valve stem threaded through said bearing and passing through the corresponding end plate, a valve having a swivelling connection with said stem and adapted to co-operate with one of said seats to open or close said opening, an inwardly extending sleeve carried by the other end plate and forming a bearing and a guide carried by the valve and working in said last mentioned bearing.

3. A device of the character described including a casing having a fluid conduit therethrough, a transverse web in said casing having an opening forming a continuation of said conduit, spaced valve seats around said opening, one on each side thereof, an end plate applicable to either end of said valve casing and detachably secured thereto, a yoke carried by said plate, a stem having a threaded connection with said yoke and working through said end plate, a valve having a socket into which the inner end of the stem projects, a split nut attached to the stem and connected to the valve forming a swiveling connection of the valve with the inner end of said stem and adapted to cooperate with the corresponding seat to open or close the same.

In testimony whereof I have signed my name to this specification.

WILLIAM J. MEAD.